No. 631,438. Patented Aug. 22, 1899.
R. H. PLASS.
SELF PROPELLING VEHICLE.
(Application filed Jan. 9, 1899.)

(No Model.) 3 Sheets—Sheet 1.

Witnesses:
A. M. E. Kennedy
Arthur Ashley

Inventor:
R. H. Plass
By N. R. Kennedy
Atty.

No. 631,438. Patented Aug. 22, 1899.
R. H. PLASS.
SELF PROPELLING VEHICLE.
(Application filed Jan. 9, 1899.)

(No Model.) 3 Sheets—Sheet 3.

Witnesses
A. W. E. Kennedy
Arthur Ashley

Inventor
R. H. Plass
By H. R. Kennedy
Attorney

THE NORRIS PETERS CO., PHOTO-LITHO., WASHINGTON, D. C.

UNITED STATES PATENT OFFICE.

REUBEN H. PLASS, OF NEW YORK, N. Y., ASSIGNOR TO ISABELLA C. PLASS, OF SAME PLACE.

SELF-PROPELLING VEHICLE.

SPECIFICATION forming part of Letters Patent No. 631,438, dated August 22, 1899.

Application filed January 9, 1899. Serial No. 701,644. (No model.)

*To all whom it may concern:*

Be it known that I, REUBEN H. PLASS, a citizen of the United States, residing at New York, (Brooklyn,) in the county of Kings and State of New York, have invented certain new and useful Improvements in Self-Propelling Vehicles; and I do hereby declare the following to be a full, clear, and exact description of the invention, such as will enable others skilled in the art to which it appertains to make and use the same.

This invention relates to self-propelling vehicles.

The object of the invention is to produce a vehicle of the kind referred to which shall be simple in construction and capable of easy manipulation, whereby it is adapted for use and operation by an unskilled person.

Further, the object of the invention is to produce a self-propelling vehicle so arranged with an engine from which the driving power is attained and connected with the driving-wheels in such manner that by shifting the engine the direction and speed of movement of the vehicle may be regulated.

With these objects in view the invention consists, essentially, of a self-propelling vehicle comprising an engine mounted on a shifting frame and means interposed between the engine and driving-wheels of the vehicle whereby the direction of movement and the stopping of the movement may be controlled.

Further, the invention consists of a self-propelling vehicle comprising an engine mounted on a frame and capable of being shifted, a clutch on the main shaft of the engine driving-wheels, a connection between the clutch and the driving-wheels, and levers for shifting the engine and for operating the clutch.

Further, the invention consists of various novel details of construction, as hereinafter fully described and claimed.

The invention is illustrated in the accompanying drawings, in which—

Figure 1:
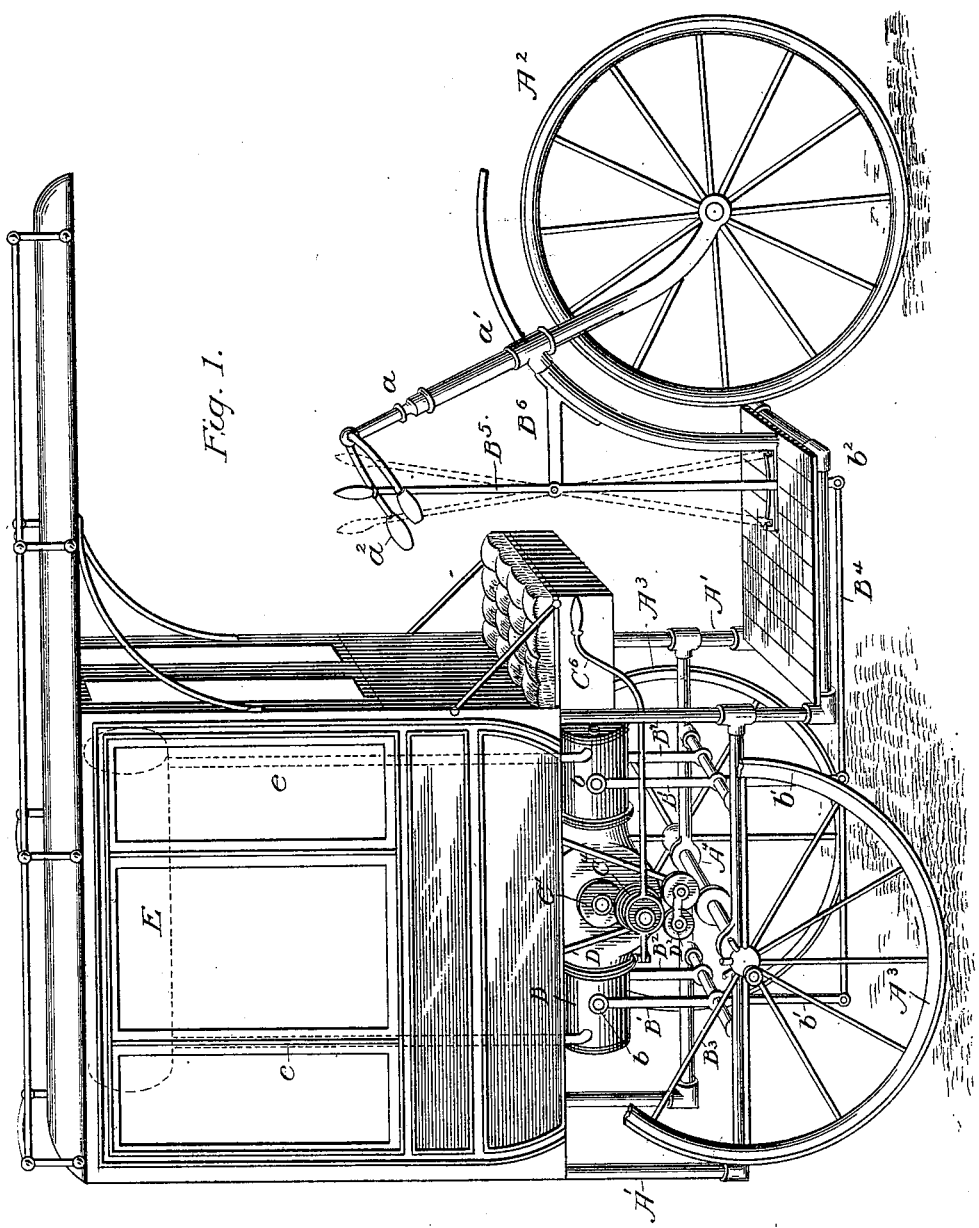
Figure 2:
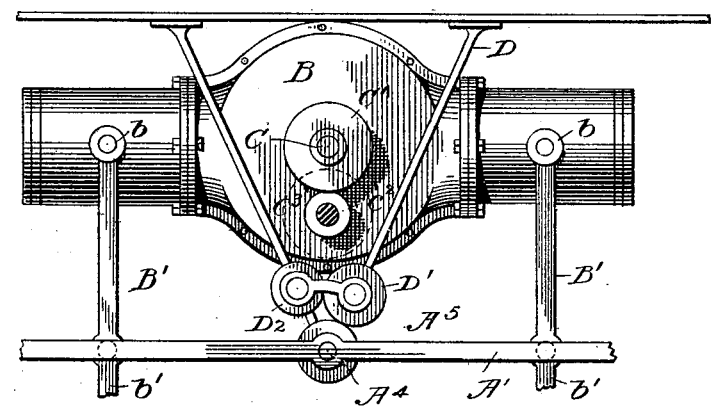
Figure 3:
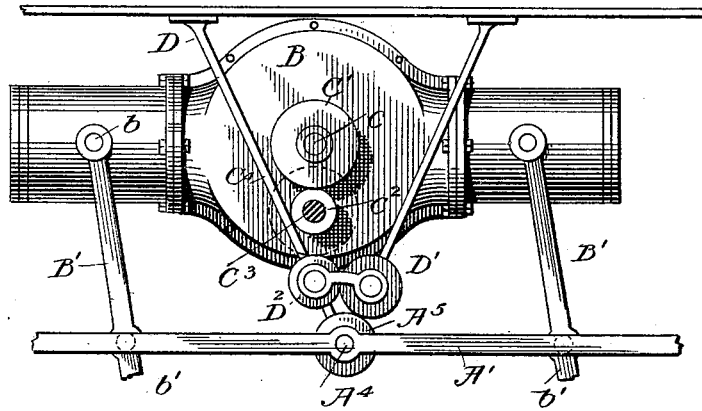
Figure 4:
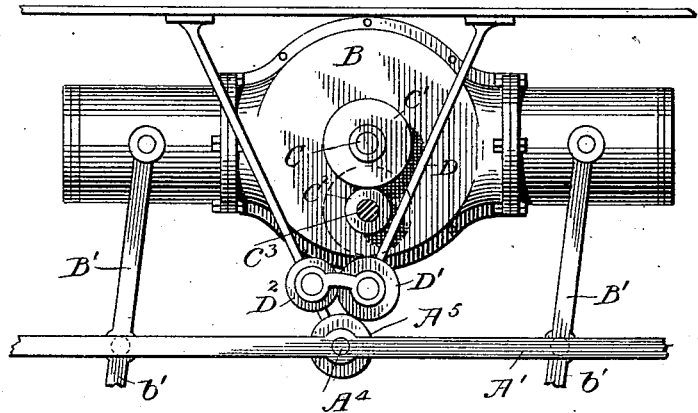
Figure 5:
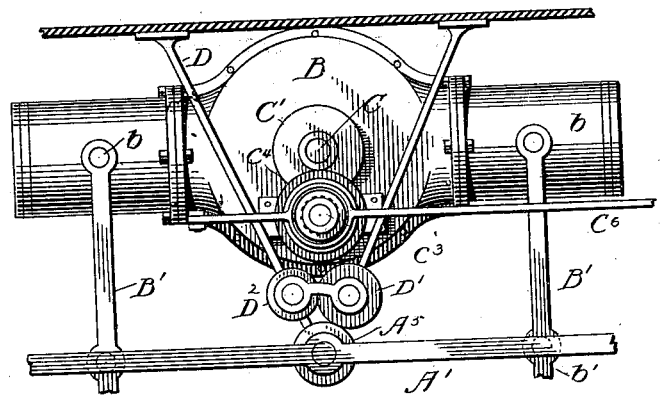
Figure 6:
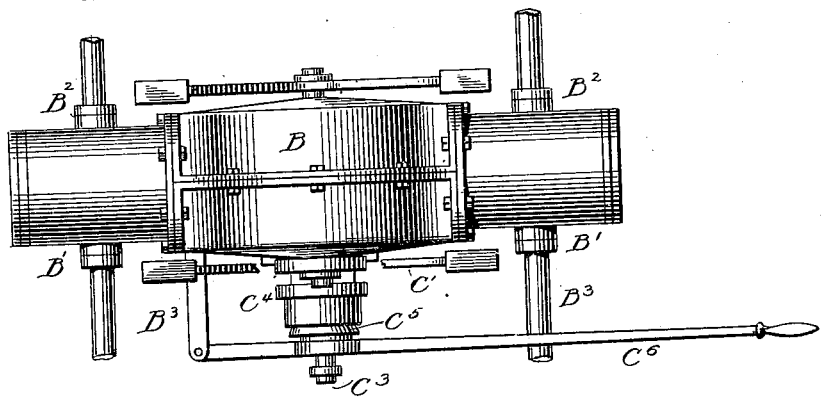
Figure 7:
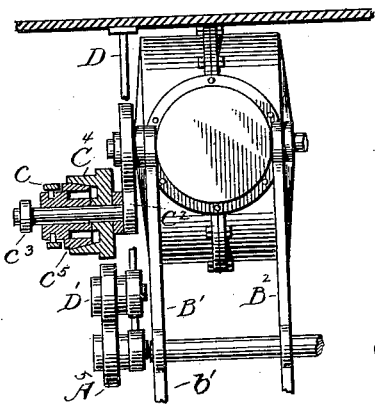

Figure 1 is a perspective view of a delivery-wagon having my invention applied thereto. Fig. 2 is a detached view of the engine and the means for connecting it with the driving-wheels of the vehicle, the clutch being removed and its position indicated by dotted lines, the positions of the parts being those assumed when the vehicle is at rest. Fig. 3 is a view similar to Fig. 2, the parts being shown in a position to move the vehicle forward. Fig. 4 is a similar view, the parts being shown in positions assumed in moving the vehicle backward. Fig. 5 is a side view showing the engine and its clutch in operative position. Fig. 6 is a plan view; and Fig. 7 is a front view of the engine and its supports, the clutch being shown in section.

In the drawings, A represents the body of the vehicle, which in the present instance is that of a delivery-wagon. Attached to the frame A' of the vehicle are the three supporting-wheels $A^2$ and $A^3$ $A^3$. The front wheel $A^2$ is suitably mounted on a standard $a$, mounted in a suitable socket $a'$, provided at its upper end with handles $a^2$ for turning the wheel to guide the vehicle. The supporting-wheels $A^3$ are permanently attached to a shaft $A^4$, mounted in the frame A' of the vehicle and provided at its center with a friction-wheel $A^5$, which is designed to receive through suitable intermediate mechanism motion from an engine B.

The engine B is mounted on upright rods B' B' $B^2$ $B^2$, which are respectively pivoted on horizontal rods $B^3$, attached to the frame A' of the vehicle. Each of the rods B' B' $B^2$ $B^2$ are pivotally connected at their upper ends at points $b$ to the engine B. The rods B' B' have downward extensions $b'$ $b'$, to the lower ends of which are pivotally connected a rod $B^4$. A lever $B^5$ is pivotally connected at a point $b^2$ to the rod $B^4$, and the rod $B^5$ is pivoted in an extension $B^6$ from the frame of the vehicle. This construction permits of the shifting of the engine B by moving the lever $B^5$.

The main shaft C of the engine is provided with a friction-wheel C', which is arranged in contact with a friction-wheel $C^2$, arranged on the end of a shaft $C^3$, which is mounted in bearings projecting from the frame of the engine. Loosely mounted on the shaft $C^3$ is a friction-wheel $C^4$, which is provided in its outer face with a tapering opening adapted to receive a block $C^5$, which is connected to the shaft $C^3$ and adapted to slide thereon. The block $C^5$ is provided with a groove $c$, which receives the fork end of a lever $C^6$, which extends to a position near the front of the vehicle and by which the block $C^5$ is capable of being slid on the shaft $C^3$.

The wheel $C^2$ being always in contact with and actuated by the wheel $C'$ on the shaft of the engine, it will be clear that by manipulating the lever $C^6$ the friction-wheel $C^4$ may be caused to move with or be detached from the shaft $C^3$. It will also be seen that by varying the contact between the parts of the clutch formed by the block $C^5$ and the opening in the wheel $C^4$ the relative speeds of the wheels $C'$ and $C^4$ may be varied at will.

Mounted on a frame D, depending from the body of the vehicle, are the two friction-wheels $D'$ and $D^2$. The friction-wheel $D'$ is arranged to be always in contact with the friction-wheel $A^5$ on the axle of the vehicle and the wheel $D^2$ is arranged to be always in contact with the wheel $D'$.

By connecting the friction-wheel $C^4$ with the driving-shaft of the engine and by moving the engine through the lever $B^5$ to bring the friction-wheel $C^4$ into contact either with the friction-wheel $D'$ or $D^2$ the vehicle will be driven in one direction or the other. When the parts move in the direction indicated by the arrows in Figs. 2 to 4 and the engine is shifted to bring the friction-wheel $C^4$ into contact with the friction-wheel $D^2$, as shown in Fig. 3 of the drawings, the vehicle will be given a forward movement, while by bringing the friction-wheel $C^4$ into contact with the friction-wheel $D'$, as shown in Fig. 4, a reverse movement will be given the vehicle.

The engine B may be of any suitable construction and is preferably a naphtha or similar engine, and it receives its supply of material for operating it from a tank E, mounted in the upper portion of the vehicle and connected to the engine by supply-pipes $e$ $e$.

The engine is designed to operate continuously while the vehicle is in use, and its driving-shaft may be entirely disconnected from the driving mechanism of the wagon by moving the parts to positions shown in Fig. 2, in which case the friction-wheel $C^4$ is not in contact with either the friction-wheel $D'$ or the friction-wheel $D^2$.

When it is desired to disconnect the engine from the shaft without shifting the engine, the lever $C^6$ may be moved outward and in this way disconnect the parts of the clutch on the shaft $C^3$, and thus the friction-wheel $C^4$ is allowed to remain at rest.

The arrangement of the engine in relation to the friction-wheels by which motion is imparted to the axle is such that when the engine is in position to drive the vehicle either in one direction or the other the entire weight of the engine is utilized to retain the friction-wheel on the engine-shaft in contact with those for imparting movement to the axle of the vehicle. The device described being designed for use on delivery and similar vehicles by which large loads are to be carried, the advantage of this construction will be apparent.

Inasmuch as it is impossible to regulate the speed of the motion transmitted from the engine to the shaft by reason of the weight of the engine being utilized to hold the friction-wheels in contact without lifting the entire weight of the engine at each variation it is necessary to employ some easily-operated means whereby the speed of the vehicle be varied when necessary. To this end the clutch on the engine-shaft, operated by the lever $C^6$ and by which the engine-shaft and the friction-wheel thereon are connected, is provided. The lever $C^6$ is arranged in convenient position to be grasped by the occupant of the seat on the front of the vehicle, and by a slight manipulation of the lever the contact between the parts of the clutch may be varied and the speed of the vehicle regulated.

Having thus described my invention, what I claim as new, and desire to secure by Letters Patent, is—

1. A self-propelling vehicle comprising an engine mounted on a shifting frame, and means interposed between the engine and the driving-wheels whereby direction of movement and the stopping of the vehicle is controlled, the frame being so constructed that in shifting to change the position of the engine the entire weight of the latter is raised from the frame of the vehicle and imposed upon the connection between the engine and the driving-wheels, substantially as described.

2. A self-propelling vehicle comprising an engine mounted on a shifting frame, driving-wheels mounted on an axle provided with a friction-wheel, friction-wheels interposed between the shaft of the engine and the friction-wheel on the axle, and a lever connected with the frame for shifting the position of the frame and engine, the frame being so constructed that in shifting to change the position of the engine, the entire weight of the latter is raised from the frame of the vehicle and imposed upon the connection between the engine and the driving-wheels, substantially as described.

3. A self-propelling vehicle comprising an engine mounted on a shifting frame, a clutch on the shaft of the engine, a friction-wheel loosely mounted on the shaft and designed to be engaged by the clutch, friction-wheels interposed between the axle and the engine, and levers for shifting the frame and operating the clutch, the frame being so constructed that in shifting to change the position of the engine, the entire weight of the latter is raised from the frame of the vehicle and imposed upon the connection between the engine and the driving-wheels, substantially as described.

4. A self-propelling vehicle comprising an engine mounted on a shifting frame, driving-wheels having an axle provided with a friction-wheel, a friction-wheel on the engine and two friction-wheels arranged on a stationary frame, the two friction-wheels mounted on the frame being in contact with each other and one of them being in contact with the friction-wheel on the axle, and a lever for shifting the engine, substantially as described.

In testimony whereof I affix my signature in presence of two witnesses.

REUBEN H. PLASS.

Witnesses:
CHARLES L. FRAILEY,
WILLIAM R. KENNEDY.